United States Patent [19]

Yang

[11] Patent Number: 5,225,729
[45] Date of Patent: Jul. 6, 1993

[54] LAP-WOUND STATOR WITH ADJUSTABLE COMMUTATING ANGLE

[76] Inventor: Tai-Her Yang, 5-1 Taipin St., Si-Hu Town, Dzan-Hwa, Taiwan

[21] Appl. No.: 830,541

[22] Filed: Jan. 31, 1992

Related U.S. Application Data

[63] Continuation-in-part of Ser. No. 583,236, Sep. 14, 1990, abandoned.

[51] Int. Cl.$^5$ .............................................. H02K 3/20
[52] U.S. Cl. .................................... 310/206; 310/179
[58] Field of Search ............... 310/206, 128, 134, 141, 310/142, 149, 173, 179, 180, 184, 198, 224, 269, 254; 318/65, 772, 739

[56] References Cited

U.S. PATENT DOCUMENTS

| | | | |
|---|---|---|---|
| 1,404,885 | 1/1922 | Nyman | 310/128 |
| 3,157,810 | 11/1964 | Adkins | 310/180 X |
| 3,887,854 | 6/1975 | Parks | 310/198 X |
| 4,292,559 | 9/1981 | Auinger et al. | 310/206 |
| 4,338,557 | 7/1982 | Wanlass | 318/729 |
| 4,520,287 | 5/1985 | Wang et al. | 310/179 |
| 4,687,977 | 8/1987 | Brahmavar et al. | 310/68 C |

Primary Examiner—Steven L. Stephan
Assistant Examiner—E. A. To
Attorney, Agent, or Firm—Leonard Bloom

[57] ABSTRACT

A stator winding for a motor comprising main, left and right poles wound by a main winding and auxiliary winding(s) which enable relatively continuous commutation angle adjustment by imparting different excitation currents upon the different windings. The auxiliary windings accommodate load variations in all types of motors. In addition, circuitry is disclosed for incorporating the auxiliary windings in a bi-directional motor for facilitating reversal of rotation.

3 Claims, 2 Drawing Sheets

LAP-WOUND STATOR WITH ADJUSTABLE COMMUTATING ANGLE

This application is a continuation-in-part, division, of application Ser. No. 07/583,236, filed Sep. 14, 1990 now abandoned.

BACKGROUND OF THE INVENTION

1. Field of the invention

The present invention relates to electric machines, and more particularly, to a stator having a plurality of lap-wound windings for allowing adjustment of the commutating angle.

2. Description of the Background

Conventional AC/DC rectifying motors, whether shunt excitation, series excitation or compound-excitation, all include commutating magnetic poles or brushes having a magnetic polar axis. The maximum load of the motor is determined by the commutating angle.

It would be greatly advantageous to provide a means for adjusting the commutating angle during rotation of the rotor to accommodate load variations.

SUMMARY OF THE INVENTION

Accordingly, it is an object of the present invention to provide a rotor winding which allows for adjustment of the commutating angle during rotation of the rotor.

It is another object of the present invention to provide a rectifying motor having a lap-wound stator with adjustable commutating angle which provides relatively continuous polar axis adjustment in accordance with the direction of rotation.

In accordance with these and other objects, the present invention provides a composite lap-wound stator which enables relatively continuous angle movement adjustment by imparting different excitation currents upon different windings for the convenience of commutation. The invention accommodates load variations in all types of motors, and is especially useful in bi-directional motors for facilitating reversal of rotation.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE INVENTION

Figure 1:
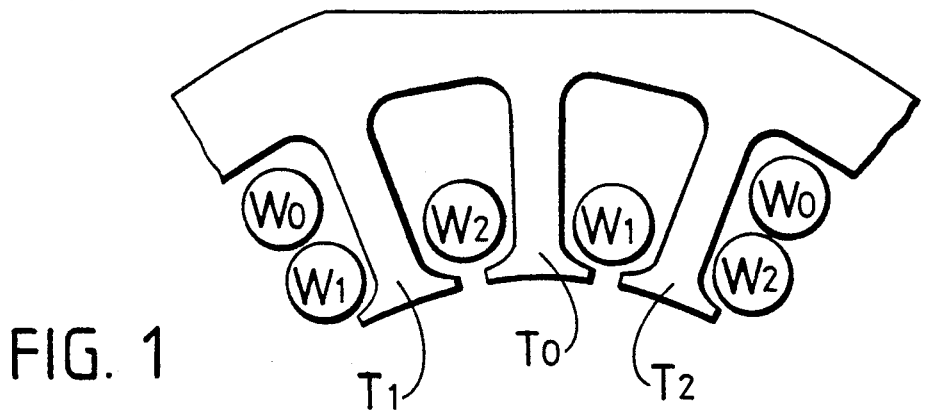
FIG. 1 shows the layout of the stator windings according to one embodiment of the present invention, including main field winding W0 in the middle position and right W2 and left W1 lap-wound windings.

The examples and characteristics of operation according to the present invention are described as follows:

Referring to FIG. 1, the stator is provided with at least three projecting poles $T_0$, $T_1$, and $T_2$.

Auxiliary poles $T_1$ and $T_2$ may be identical in size, or alternatively, may be of different sizes as necessary. Main pole $T_0$ in the middle position may also be greater, smaller or identical in size than/with the auxiliary poles at either side.

The poles are wound as follows:

Main winding $W_0$ is wound around the three projecting poles, auxiliary winding $W_1$ is wound around the main pole $T_0$ and pole $T_1$, and auxiliary winding $W_2$ is wound around pole T0 and pole T2. The position of the pole center of the resulting composite magnetic field depends upon the selection of the winding(s), and on the proportional magnitudes of the excitation currents imparted to the selected windings of FIG. 1.

Figure 2:
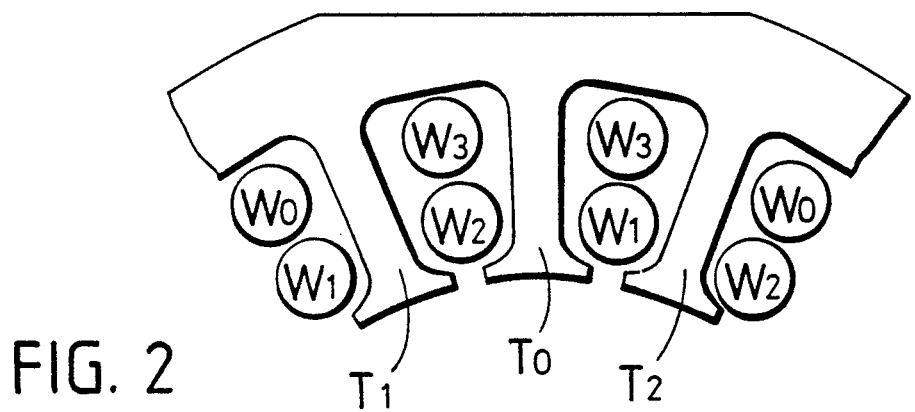
FIG. 2 shows the layout of the windings according to a second embodiment of the present invention, including main field winding W0 in the middle position, supplemental winding W3 in the middle position, and right W2 and left W1 lap-wound windings.

The embodiment of FIG. 2 incorporates the basic embodiment of FIG. 1 and, additionally, the following:

A fourth winding W3 wound around the intermediate pole. Winding W3 may be independently excited for correcting the magnetic field wave shape, or alternatively, may be wound in series with the main winding $W_0$ of FIG. 2.

Figure 3:
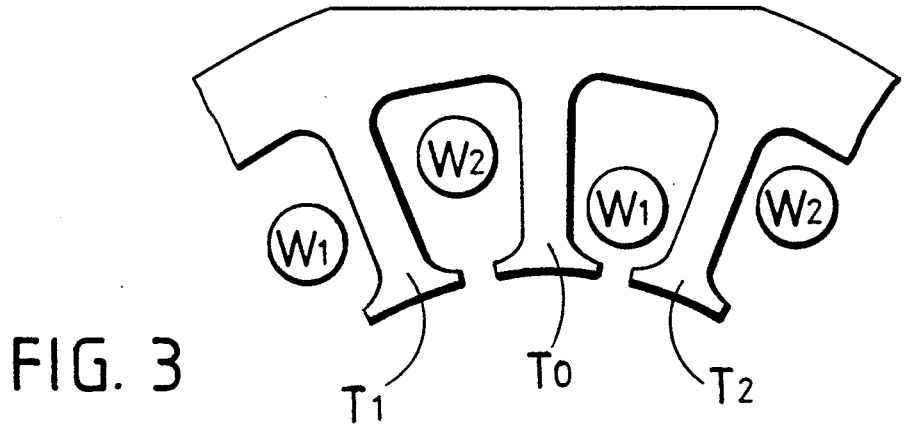
FIG. 3 shows the layout of a composite winding according to a third embodiment of the present invention, the composite winding comprising right W2 and left W1 lap-wound commutating windings.

In the embodiment of FIG. 3, a pair of windings are incorporated as follows:

auxiliary winding $W_1$ is wound around the intermediate pole $T_0$ and left pole T1, and auxiliary winding $W_2$ is wound around the intermediate pole $T_0$ and right-handed pole $T_2$, and the position of pole center of composite field will be moved depending on the selection of excitation intensity among each winding as shown in FIG. 3.

Figure 4:
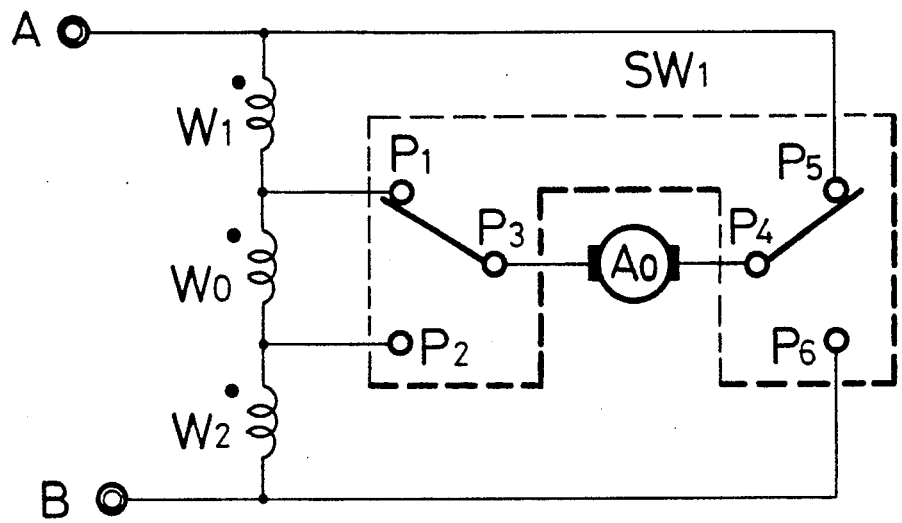
FIG. 4 is a circuit diagram showing the embodiment of FIG. 1 configured for use in a compound-excitation rotation-reversing driving motor.

The above-described embodiments have many practical applications in the field of AC/DC type series, shunt or compound motors, but are especially useful when used in a rotation reversing model. A circuit diagram of a rotation reversing motor incorporating the three-winding stator of FIG. 1, and its associated circuitry, is shown in FIG. 4 wherein:

Control switch SW1 is a double-pole double-throw switch having poles P3 and P4 respectively connected via brushes to the windings of armature A0. Contact P1 is connected to contact P5 through auxiliary winding W1. Main winding W0 is connected in series between auxiliary windings W1 and W2. Contact P2 is connected to contact P6 through auxiliary winding W2.

Left auxiliary winding $W_1$, main winding $W_0$ and right auxiliary winding $W_2$ have identical excitation polarities, and all three series-connected windings are connected in parallel to power input terminals A and B for connection to a power supply; the motor A0 may be placed in positive or reversed rotation by means of switch SW1. More specifically, when $P_1$ is connected to $P_3$, and $P_4$ is connected $P_5$, $W_1$ is in parallel with armature A0 and in series with windings W0 and W2 between power input terminals A and B. Main winding $W_0$ is in series with right auxiliary winding $W_2$, and windings W0, W1 and W2 are parallel to power input terminals A and B. The above-described configuration results in a positive-rotation compound motor. However, upon switching of SW1, $P_2$ will be connected to $P_3$, and $P_4$ will be connected to $P_6$. In this state, armature $A_0$ will rotate in the reverse direction of operation.

Figure 5:
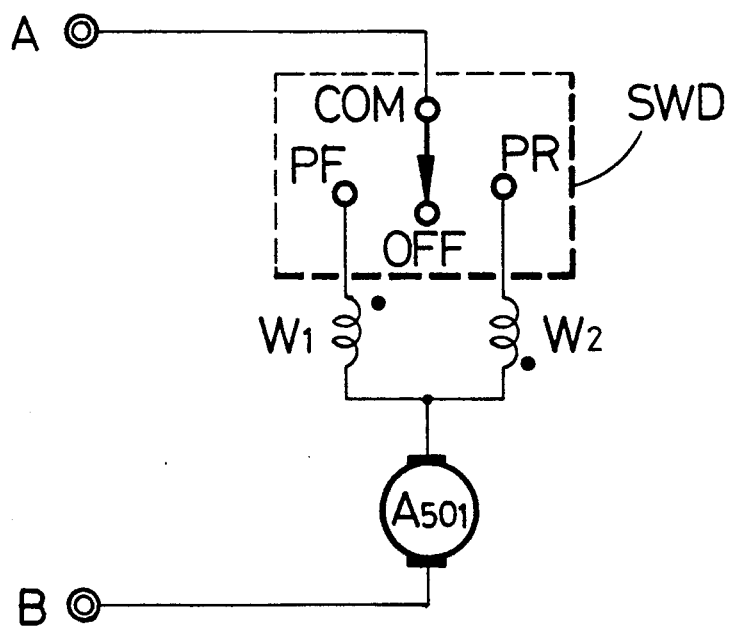
FIG. 5 is a circuit diagram showing the embodiment of FIG. 3 configured for use in a rotation-reversing driving motor.

A further embodiment of the present invention incorporating the lap-wound bilateral winding of FIG. 3, is as shown in FIG. 5, wherein either one of lap-wound positive rotation field winding W1 and reversal rotation field winding W2 may be switched in series with armature A501. In this embodiment, windings W1 and W2 have opposite excitation polarities relative to each other. The other end of the two windings W1 and W2 are respectively connected to contact points PF and PR of control switch SWD. Control switch SWD is a single-pole single-throw switch having a common connection point COM, and power input terminal A is wired directly to the point COM. Power input terminal B is wired directly to one winding of armature A501.

In operation, when the point COM of control switch SWD and contact PF are connected, the polar axis of field winding W1 and armature A501 are aligned in a positive rotation commutating angle, and the motor will operate with a positive operation.

When point COM of control switch SWD and point PR are connected, the polar axis of field winding W2 and armature A501 are aligned in a reverse rotation commutating angle, and the motor will operate with a reversed rotation.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept.

For example, all of the above embodiments can be applicable to power generators.

It is to be understood, therefore, that within the scope of the appended claims, the invention may be practiced otherwise than as specifically set forth herein.

I claim:

1. A reversing motor assembly, comprising:
   a pair of terminals for connecting a power supply;
   a commutated motor, said motor further comprising,
   a rotor,
   commutating means for distributing power from said power supply to said rotor, said commutating means further comprising a first contactor and a second contactor, said first contactor and second contactor maintaining electrical contact with said rotor,
   a stator having a plurality of stator teeth projecting inward form around a cylindrical periphery, said stator teeth being sequentially arranged in sets around said periphery, wherein each set comprises a main stator tooth and a pair of flanking auxiliary stator teeth,
   a plurality of stator winding connected in series between said power terminals, said stator windings including a main winding wound around a collective set of said stator teeth, and a plurality of auxiliary windings each wound around a collective subset of said stator teeth for creating a composite magnetic field having a pole center which may be adjusted by varying a proportional magnitude of excitation current in said main and auxiliary windings, said plurality of auxiliary windings including a first auxiliary winding wound around said main stator tooth and one of said auxiliary stator teeth for adjusting said composite pole in one direction, and a second auxiliary winding wound around said main stator tooth and another of said auxiliary stator teeth for adjusting said composite pole in another direction; and
   a double-pole double-throw reversing switch having a first pair of throw contacts parallely connected to said main winding and a first pole connected to said first contactor, and a second pair of throw contacts parallely connected across said set of windings and a second pole connected to said second contactor,
   wherein said reversing switch may be placed in one of a first and a second position, said first position creating a composite magnetic pole having a pole center for driving said rotor in a clockwise direction, and said second position creating a composite magnetic pole having a pole center for driving said rotor in a counter-clockwise direction.

2. A motor stator, comprising;
   a plurality of stator teeth projecting inward from around a cylindrical periphery, said stator teeth being sequentially arranged in sets around said periphery, wherein each set comprises a main stator tooth and a pair of flanking auxiliary stator teeth;
   a main winding wound around a collective set of said stator teeth; and
   a plurality of auxiliary windings each wound around a collective subset of said stator teeth for creating a composite magnetic field having a pole center which may be adjusted by varying a proportional magnitude of excitation current in said main and auxiliary windings, said plurality of auxiliary windings including a first auxiliary winding wound around said main stator tooth and one of said auxiliary stator teeth for adjusting said composite pole in one direction, and a second auxiliary winding wound around said main stator tooth and another of said auxiliary stator teeth for adjusting said composite pole in another direction.

3. A motor stator, comprising;
   a plurality of stator teeth projecting inward from around a cylindrical periphery, said stator teeth being sequentially arranged in sets around said periphery, wherein each set comprises a main stator tooth and a pair of flanking auxiliary stator teeth;
   a main winding wound around a collective set of said stator teeth; and
   a plurality of auxiliary windings each wound around a collective subset of said stator teeth for creating a composite magnetic field having a pole center which may be adjusted by varying a proportional magnitude of excitation current in said main and auxiliary windings, said plurality of auxiliary windings including a first auxiliary winding wound around said main stator tooth and one of said auxiliary stator teeth for adjusting said composite pole center in one direction, a second auxiliary winding wound around said main stator tooth and another of said auxiliary stator teeth for adjusting said composite pole center in another direction, and a third auxiliary winding wound around said main pole.

* * * * *